United States Patent
Krishnan et al.

(10) Patent No.: US 10,127,125 B2
(45) Date of Patent: Nov. 13, 2018

(54) APPLICATION MONITORING AND FAILURE PREDICTION

(71) Applicant: Accenture Global Solutions Limited, Dublin (IE)

(72) Inventors: Mythili Krishnan, Bangalore (IN); Vijay Desai, San Diego, CA (US); Narayanaswamy Thimmappa, Bangalore (IN); Mriga Bansal, Bangalore (IN); Kunal Bhowmick, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 71 days.

(21) Appl. No.: 15/299,516

(22) Filed: Oct. 21, 2016

(65) Prior Publication Data

US 2018/0113773 A1   Apr. 26, 2018

(51) Int. Cl.
G06F 11/00 (2006.01)
G06F 11/22 (2006.01)
G06F 11/34 (2006.01)
G06F 11/07 (2006.01)
G06F 11/30 (2006.01)
G06N 5/02 (2006.01)

(52) U.S. Cl.
CPC ........ *G06F 11/2257* (2013.01); *G06F 11/008* (2013.01); *G06F 11/0706* (2013.01); *G06F 11/079* (2013.01); *G06F 11/0751* (2013.01); *G06F 11/0793* (2013.01); *G06F 11/302* (2013.01); *G06F 11/3476* (2013.01); *G06N 5/022* (2013.01); *G06F 2201/81* (2013.01)

(58) Field of Classification Search
CPC .................................................. G06F 11/2257
See application file for complete search history.

(56) References Cited

U.S. PATENT DOCUMENTS 7,539,907 B1 * 5/2009 Johnsen ................ G06F 11/008
                                                714/26
9,471,452 B2   10/2016 McElhinney et al.
(Continued)

FOREIGN PATENT DOCUMENTS

WO   2013/072232   5/2013

OTHER PUBLICATIONS

Felix Salfner et al., "A survey of online failure prediction methods including appendix", ACM Computing Surveys, vol. 68, No. 3, Mar. 1, 2010, pp. 1-68.

*Primary Examiner* — Christopher S McCarthy
(74) *Attorney, Agent, or Firm* — Mannava & Kang, P.C.

(57) ABSTRACT

Data from an application is analyzed periodically in real-time using a predictive data model to predict potential application failures. Application logs are used to build the predictive data model. The predictive data model includes features created from the application logs which are good predictors of application failures. The predictive data model analyzes and provides anomaly scores for various anomalies for the real-time data collected over a time period. The anomaly scores are compared with a threshold score to predict the probability of occurrences of application failures. If there is a higher probability of occurrence of an incident of application failure, corrective actions to mitigate or reduce the probability of occurrence of the application failure are implemented.

7 Claims, 9 Drawing Sheets

(56) References Cited

U.S. PATENT DOCUMENTS

| | | | |
|---|---|---|---|
| 2006/0195745 A1* | 8/2006 | Keromytis | G06F 11/0742 714/741 |
| 2007/0055914 A1* | 3/2007 | Chandwani | G06F 11/008 714/47.2 |
| 2007/0124625 A1* | 5/2007 | Hassan | H04L 1/002 714/704 |
| 2007/0299706 A1* | 12/2007 | Galt | B22D 17/32 705/7.11 |
| 2009/0249129 A1 | 10/2009 | Femia | |
| 2010/0011100 A1* | 1/2010 | Kaneko | G06F 11/008 709/224 |
| 2010/0023810 A1* | 1/2010 | Stolfo | G06F 11/3652 714/38.11 |
| 2011/0061041 A1* | 3/2011 | Hellebro | G06F 8/70 717/120 |
| 2015/0100940 A1* | 4/2015 | Mockus | G06F 8/70 717/101 |
| 2016/0274990 A1* | 9/2016 | Addleman | G06F 11/3409 |
| 2016/0275628 A1 | 9/2016 | Mishra et al. | |
| 2016/0350671 A1* | 12/2016 | Morris, II | G06N 7/005 |
| 2017/0006135 A1* | 1/2017 | Siebel | H04L 67/02 |
| 2017/0230229 A1* | 8/2017 | Sasturkar | H04L 41/0631 |
| 2017/0235620 A1* | 8/2017 | Barclay | G06F 11/004 714/47.2 |
| 2017/0308802 A1* | 10/2017 | Ramsoy | G06N 7/005 |
| 2018/0006918 A1* | 1/2018 | Swarnannanjunathan | H04L 43/0823 |

* cited by examiner

APPLICATION MONITORING AND FAILURE PREDICTION

BACKGROUND

The advent of powerful computing devices and ubiquitous communication networks enabled users to conduct many tasks almost instantaneously when they have access to a computing device which has network connectivity. In fact, many operations which used to be conducted at a single location can now be spread among various far flung locations due to the access to the computing devices and communication networks. Many organizations are highly computerized with applications being used for operations such as running manufacturing assembly lines, marketing, accounting, HR (Human Resources), security and the like. Moreover, the usage of mobile devices for commercial tasks has exploded so that people can accesses these applications and execute their tasks at any time of the day and from any point on the globe which has data network connectivity. Organizations may have certain mission critical applications which need to be run reliably as their failure can cause enormous loss to a business.

BRIEF DESCRIPTION OF DRAWINGS

Features of the present disclosure are illustrated by way of examples shown in the following figures. In the following figures, like numerals indicate like elements, in which.

DETAILED DESCRIPTION

For simplicity and illustrative purposes, the present disclosure is described by referring mainly to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An application failure prediction system (AFPS) disclosed herein is configured for accessing the real-time data from an application executing on a computing apparatus, predicting anomalies which may be indicative of potential application failures and implementing corrective actions to mitigate the occurrences of the anomalies. Real-time data from the application is periodically obtained by the AFPS at various time intervals and analyzed using a predictive data model to obtain respective anomaly scores for the various anomalies. The respective anomaly scores represent the probabilities of occurrence of the potential application failures. Each of the respective anomaly scores are compared with a threshold to determine the severity levels of the anomalies.

A graphical user interface (GUI) is configured to provide status alerts for the application in different colors based on the severity levels of the anomalies being detected in the real-time data. Those anomalies with anomaly scores less than the threshold may be determined to be of low severity thereby indicating a lower probability to cause application failures. The GUI indicates anomalies with low severity in green color thereby conveying to a human user that there is low probability of application failures due to those anomalies. Those anomalies with anomaly scores higher than the threshold but within a predetermined range of the threshold may be determined to be of moderate severity indicating a medium probability to cause application failures. The GUI may display anomalies with medium severity in amber color thereby conveying that there is medium risk of application failures arising from the medium-severity anomalies. Anomalies with very high anomaly scores may be determined to be highly severe thereby indicating an imminent application failure due to such high-severity anomalies. The GUI indicates such high-severity anomalies in red color.

As mentioned above, the AFPS not only detects anomalies and determines their potential for application failures but also provides for implementing corrective actions in order to avoid the application failures thereby ensuring the smooth operation of the application. For anomalies with low severity, the AFPS deems them to have a very low potential for causing application failures. Hence, the AFPS does not attempt to identify any corrective actions for such low-severity anomalies. For high-scoring anomalies that are determined to be of moderate or high severity, the AFPS is configured to identify corrective actions that lower the probability of application failures associated with these anomalies. The corrective actions can be identified by the AFPS, for example, by accessing the application logs.

The anomalies or incidents of potential application failures may be characterized by their attributes. The AFPS may employ supervised learning techniques to identify anomalies with similar attributes that may have previously occurred and are recorded within the application logs. The corrective actions taken in response to the similar anomalies which mitigated the occurrences of application failures are identified from the application logs and are implemented by the AFPS. In an example, the AFPS may be configured with a self-healing capacity wherein the corrective actions identified from the application logs may be automatically implemented without human intervention for the resolution of the high-scoring anomalies. Upon automatically implementing the actions, the AFPS may again determine the anomaly scores for the anomalies for which the automatic actions were implemented. If the anomaly scores are reduced to less than the threshold, the status alert may be changed from amber or red to green automatically. If the corrective actions identified from the application logs cannot be automatically implemented, the AFPS may be configured to transmit messages such as Small Messaging Service (SMS) messages, Instant Messages (IMs), emails or other alerts/notifications with information regarding the corrective actions to be taken in order to prevent the potential application failures to monitoring personnel designated within the AFPS or the application to receive the messages. Similarly, if no corrective actions could be identified from the application logs, messages as described above may be transmitted to the designated monitoring personnel. The messages in this case may however, include the information regarding the anomaly and its severity. The AFPS described herein is thus enabled to analyze the status of applications and implement actions that cause changes in external systems executing the application to ensure the smooth execution of the application thereby providing a high quality of user experience.

The AFPS initially builds the predictive data model from the application logs collected over a long period of time. The AFPS may use supervised and unsupervised learning techniques in order to construct the predictive data model. Using unsupervised learning techniques, the targets or incidents of application failures that previously occurred are identified from the application logs. Application failures or application malfunctions can include those incidents where an aspect of the application does not function per specifications or as expected by users. The attributes of the targets such as the time of occurrence of error, the error messages and error codes, the duration of errors, the types of errors, the number of occurrences of the errors and the like may be combined to create features using for example, A-priori algorithm. The features thus created may again be applied to the application logs from which they were created in order to determine their probabilities to predict the targets. Those features with high probability scores to predict the targets are selected for training the predictive data model.

Figure 1:
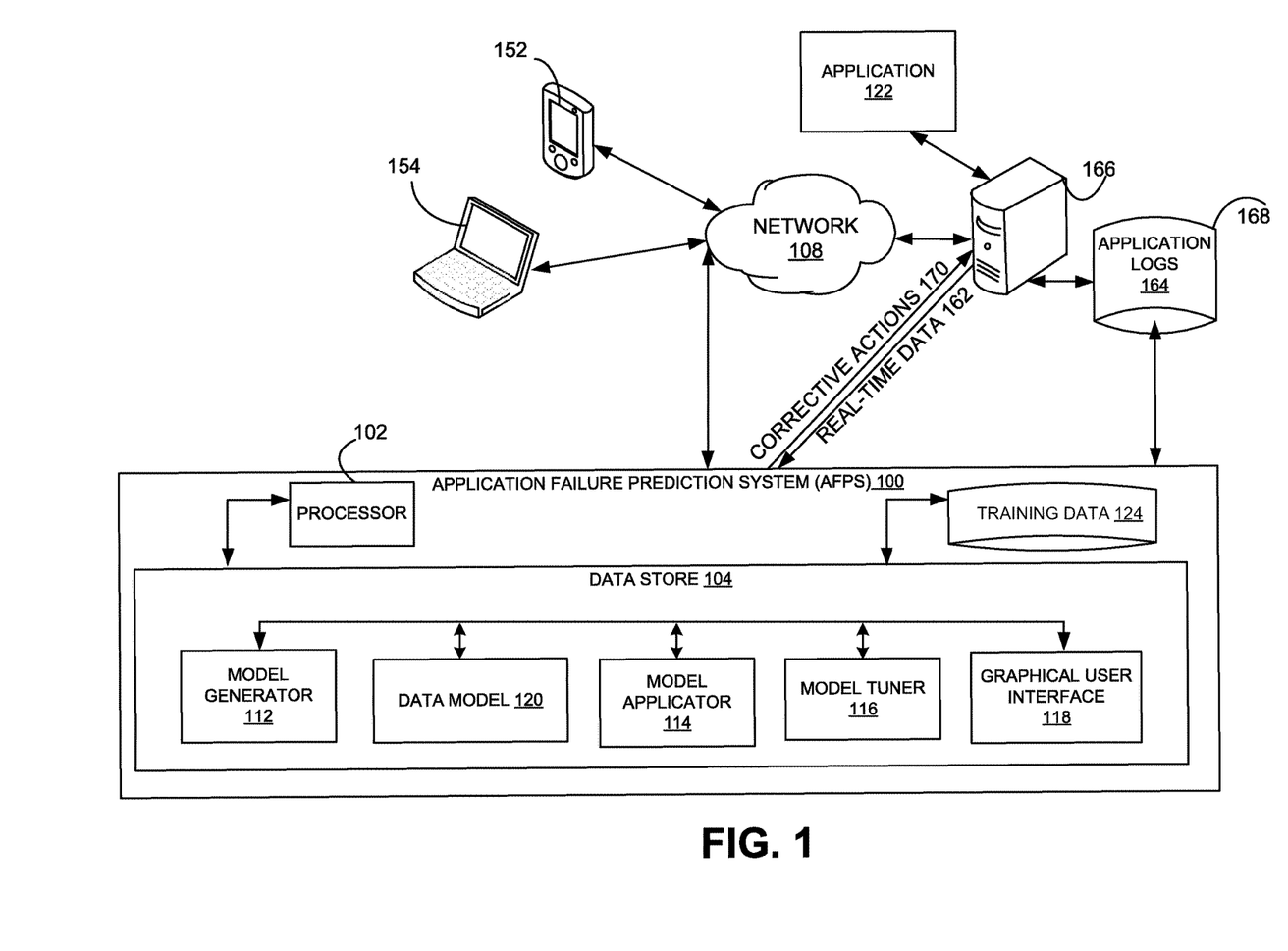
FIG. 1 illustrates an example environment that employs an application failure prediction system (AFPS)

FIG. 1 illustrates an example environment that employs an application failure prediction system (AFPS) 100 which uses a model to analyze logs of an application to predict the probability of application failure. A server 166 executes an application 122, for example a web-based, e-commerce application that is accessed by a plurality of user devices 152, 154 via a communication network 108 such as the Internet. In an example, the application 122 may be a series of processor-executable instructions stored in a processor-readable storage medium on the server 166 and being executed by one or more processors within the server 166 and/or other devices. The series of processor-executable instructions comprised in the application 122 may enable the application to receive and process inputs and provide outputs based on the processing of the inputs. The inputs may be received manually from human users or from other applications, external machinery, databases and the like. The outputs from the application 122 may produce various changes within the application 122 or even external systems. Certain elements may be discussed below with respect to the web-based, e-Commerce application only by the way of illustration but not limitation. It can be appreciated that various other types of applications such as but not limited to, applications controlling machinery and other equipment, telecommunication applications facilitating network communications between various devices, data access and management applications, medical applications and the like may be monitored and administered by the AFPS 100 in accordance with examples discussed herein.

The various operations that occur during the normal execution of the application 122 such as but not limited to, accessing the application 122 by the plurality of user devices 152, 154, the user requests fulfilled by the application 122, any changes to databases (not shown) made by the application 122, the success or failure of the various interactions from one or more of the user devices 152, 154 are recorded in the application logs 164. The application logs 164 may be temporarily cached on the server 166 and may be offloaded to a data store 168 at predetermined times. The application logs 164 therefore comprise valuable data on the operation of the application 122 including its successes and failures and if mined properly, the data from such application logs 164 may yield reasons on why the application 122 failed to perform under given conditions.

Examples of the application failure prediction system (AFPS) 100 discussed herein are configured to process the application logs 164 to build a predictive data model 120. The predictive data model 120 can be applied to real-time data 162 from the application 122 to predict and mitigate an anomaly or a potential application failure by implementing corrective actions 170 in advance of the application failure. It can be appreciated that the AFPS 100 can be executed by the server 166 that executes the application 122 or by another machine with the processor 102 and the data store 104. The AFPS 100 may be at the same location as the server 166 or it may be located remotely from the server 166. In an example, the application logs 164 may also be located remotely from the AFPS 100. In fact, the AFPS 100 may thus be connected to a plurality of machines each of which may be executing a different application for which the AFPS 100 executes a respective predictive data model to monitor application data and predict application failures. For the purposes of brevity, the below description will be confined to one application although the features discussed herein are equally applicable when the AFPS 100 is executing the plurality of respective predictive data models corresponding to the plurality of applications.

The AFPS 100 comprises at least a model generator 112, a model applicator 114, a model tuner 116 and the predictive data model 120. The model generator 112 comprises processor-executable instructions to access the application logs 164, identify targets which include incidents of application failures. Generally, incidents of applications failures tend to be are rather infrequent given the volume of data in the application logs 164. A subset of the features which are generated from the targets are selected for including within the predictive data model 120. The predictive data model 120 thus generated can be initially trained with training data 124 which may comprise a subset of the application logs 164. Once implemented, the predictive data model 120 can be trained with the feedback from the predictions it generates The model applicator 114 comprises processor-executable instructions that receive and analyze the real-time data 162 by applying the predictive data model 120. The real-time data 162 may be obtained by the AFPS 100 from the application 122 even as it is being generated at the server 166. The real-time data 162 may be further processed at the AFPS 100 to convert unstructured data from the server 166 to structured data in order to facilitate analytics. This enables the AFPS 100 to monitor the status of the application 122 and take proactive actions for incidents that are likely to cause application failures prior to the actual occurrence of the application failures. The real-time data 162 can comprise information or metadata regarding the various operations that occur during the course of execution of the application 122. This can include user interaction data from one or more of the user devices 152, 154, metadata of the operations which are carried out by the application 122 including their date and time of execution, the resources accessed, the information regarding the success or failure of operations and the like.

Anomalies in the real-time data 162 which can lead to application failures are identified by the predictive data model 120. Anomalies may include a combination of error codes which the predictive data model 120 is trained to identify as leading to a high probability of application failure. When the real-time data 162 is analyzed using the predictive data model 120, the likelihood or probabilities of application failures are obtained. These probabilities can be compared to a predetermined threshold probability to identify those anomalies or incident patterns that may result in application failures. Using historical information from the application logs 164, the predictive data model 120 can be trained to recognize severities of the anomalies which may vary from those which can be disregarded to those which indicate an imminent application failure. Consequently, the predictive data model 120 can be trained to identify outliers or anomalies that may be indicative of application performance issues.

When anomalies having a higher probability of application failure such as those with medium to high severities are identified, a set of actions may be implemented. Such actions may include corrective actions 170 that are automatically implemented, for example, at the application server 166, that are directed towards the anomalies with medium to high severities so that the probability of application failure is reduced to below the threshold. The corrective actions 170 can be identified from historical data such as the application logs 164. The actions that were previously implemented for anomalies with similar error or event patterns can be identified for replication by the predictive data model 120. When the corrective actions 170 cannot be automatically implemented, for example, because they require human intervention, the AFPS 100 can transmit messages to concerned personnel with the prior solutions as the suggested solutions. Also, if no corrective actions could be identified from the application logs 164, messages may be transmitted by the AFPS 100 to the concerned personnel. The transmissions may include but are not limited to, emails, SMS (Small Message Service), IMs (Instant Messages), automated phone calls and the like and may include details regarding the anomalies and their severities.

The predictive data model 120 is continuously trained on the application logs 164 even as it is being used for detecting anomalies. When the anomalies are resolved either via automatically implementing actions at the server 166 or via messaging the concerned personnel, the application logs 164 get updated to record such outcomes of the corrective actions 170. The model tuner 116 is therefore configured to provide a feedback element in training the predictive data model 120 as the application logs 164 get updated with outcomes of predictions that were made during the routine use of the predictive data model 120. Therefore, the predictive data model 120 improves with usage thereby generating probabilities of application failures more accurately.

The GUI 118 included in the AFPS 100 is configured to provide a graphical representation of the interactions that are constantly received in the real-time data 162 stream. When the anomalies indicative of potential application failures are detected, a status indicator icon on the GUI 118 may change colors, for example, to indicate the severities of the anomalies. If the anomalies are resolved by automatically implementing the corrective actions 170, then the success of the corrective actions 170 may be again indicated for example, by changing the status indicator to green. If the AFPS 100 failed to resolve the anomalies automatically via implementing the corrective actions 170, an amber alert of the status indicator may be escalated to a red alert and actions such as but not limited to, transmitting messages to the concerned personnel and other procedures to address such failures may be implemented.

Figure 2:
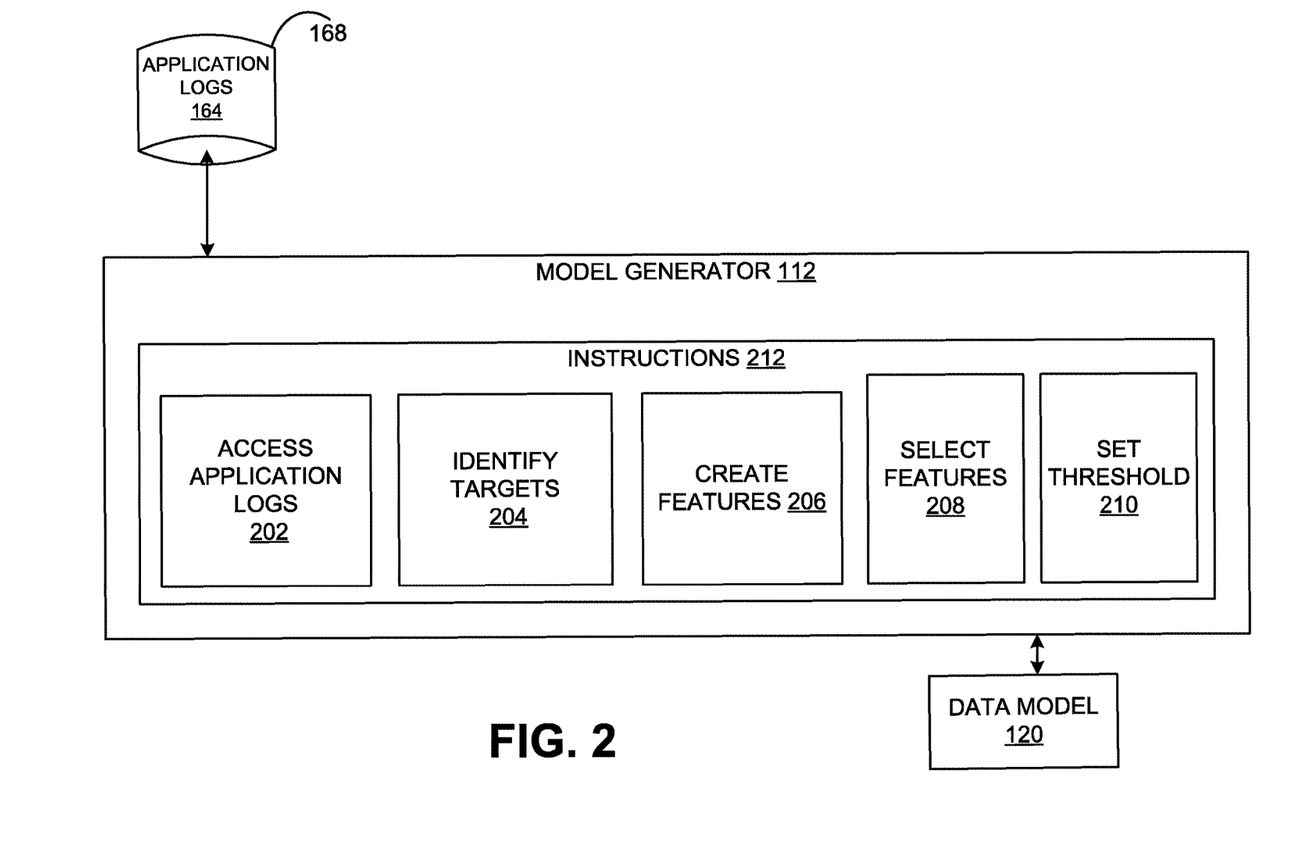
FIG. 2 is a block diagram that shows an example of the model generator.

FIG. 2 is a block diagram that shows an example of the model generator 112. The model generator 112 comprises instructions 212, which when executed by the processor 102, generate the predictive data model 120 from the application logs 164. Accordingly, the model generator 112 includes instructions to access the application logs 202. For example, the application logs 164 for a web-based application may include various types of data such as but not limited to site confidence monitoring data logs, application logs, access logs, and other data logs. It can be appreciated that the application logs 164 may be stored on data stores in the same location as the server 166 which executes the application 122 or other machines which may be remote from the server 166.

The model generator 112 further includes instructions to identify targets 204 or incidents of application failures from the application logs 164. The identified targets may be characterized by metadata such as but not limited to errors, alerts or other incidents recorded in the application logs 164 which are characterized by one or more of error ID, error start time, the step at which error occurred, severity of the error, error type, error duration, status, warning data, stop/start of interactive sessions, middleware error codes, inter system connectivity (such as connection to database), transactions, standard HTTP (hypertext transfer protocol) error codes, or other critical error codes that may be identified by the administrators or users of the application 122.

The model generator 112 which includes the instructions 206 to create features employs the identified targets to create features. Features can be patterns of the metadata that characterize the targets. Anomalous patterns of errors are likely causes of incidents. Over time, the predictive data model 120 can "self-learn" more anomaly patterns by creating different associations between the errors. For example, a specific temporal pattern of critical error codes may precede a given alert or an incident of application malfunction in the application logs 164. The model generator 112 includes instructions to create a feature from the specific pattern of critical error codes. Similarly, numerous features can thus be created using one or more of the metadata of the targets that are obtained by examining the application logs 164. In an example, the instructions for feature creation 206 may include unsupervised learning techniques which are used by the processor 102 for creating the features.

The model generator 112 includes further instructions 208 to select features in order to select a subset of the created features for generating the predictive data model 120. In an example, the created features can be applied to the application logs 164 using supervised learning techniques such as the random forest model in order to select the subset of features which have a high likelihood or high probability of predicting the target. The features thus selected by the instructions 208 are employed in the predictive data model 120 which is used for analyzing the real-time data 162.

Based on the probabilities obtained while selecting the subset of features for inclusion in the predictive data model 120, the model generator 112 includes instructions 210 to set predetermined probability threshold value to be used for various alert types. In an example, the selected subset of features can be applied against application logs 164. More particularly, the selected subset of features are applied to scoring data in the application logs 164 which may be different from the data that was originally used to create the features. Anomaly scores for the selected subset of features are thus generated for the scoring data can be used to set thresholds. Based on the range of the anomaly scores, a value such as but not limited to, a midpoint within the range may be selected as a threshold for determining the various red, amber and green alerts. It can be appreciated that other methods of setting thresholds may also be used in accordance with different examples.

Figure 3:
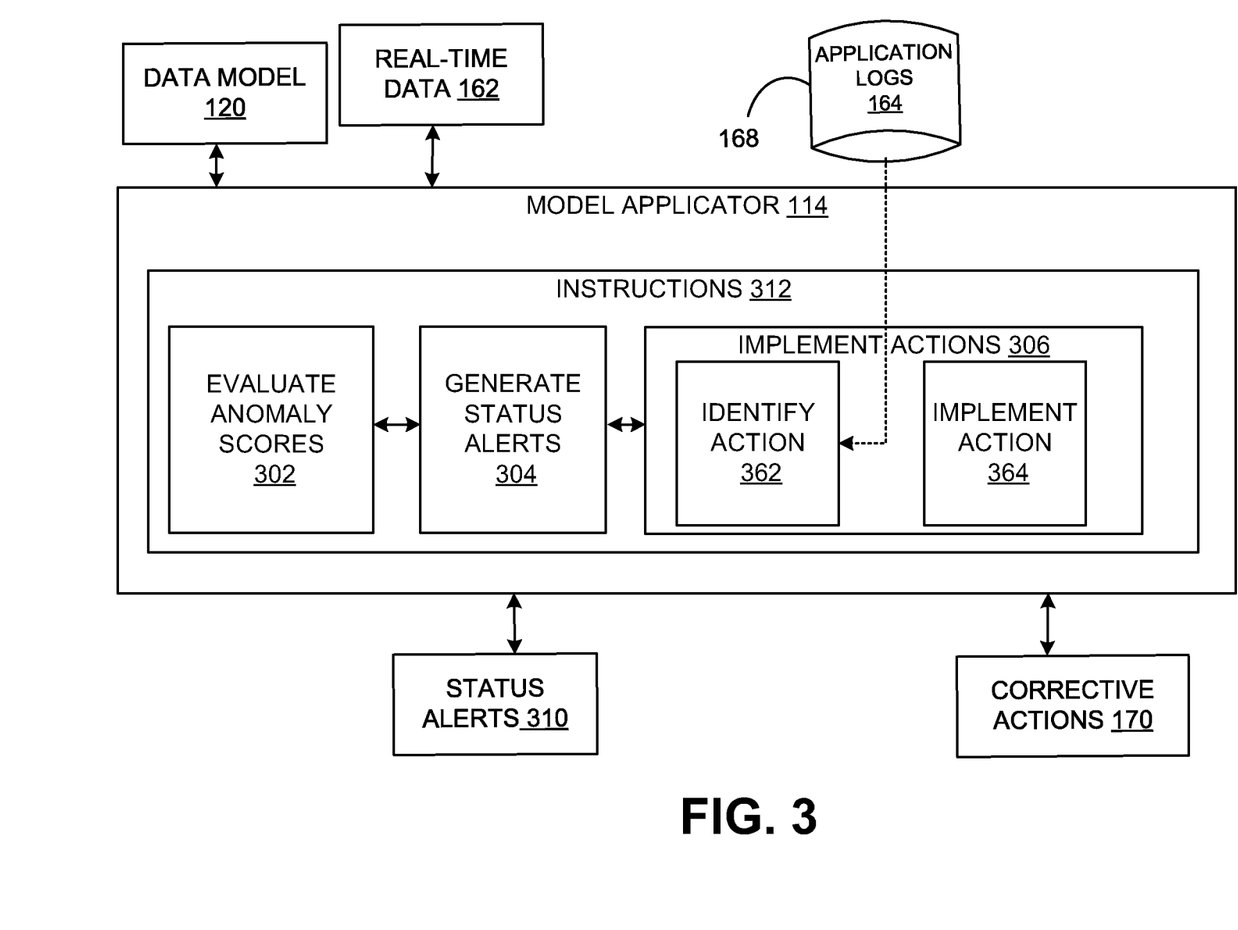
FIG. 3 is a block diagram that shows one example of the model applicator.

FIG. 3 is a block diagram that shows one example of the model applicator 114 which includes instructions 312 to apply the predictive data model 120 in analyzing the real-time data 162 to identify anomalies, transmit status alerts 310 via the GUI 118 for example, and implement the corrective actions 170. The model applicator 114 applies the predictive data model 120 for analyzing the real-time data 162. Accordingly, the probabilities of occurrence of the features included in the predictive data model 120 in the real-time data 162, are initially evaluated. Based on the probabilities, anomaly scores can be evaluated for each of the targets by the instructions 302.

The anomaly scores for the targets based on the real-time data 162 is compared to the threshold probability by the instructions 304 included in the model applicator 114 for generating status alerts 310. If the anomaly scores of the targets are less than the threshold, it indicates that the probability of application failures are very low and such targets can be disregarded with no action being implemented from the AFPS 100. Accordingly, the status alert on the GUI 118 is set to green. If the anomaly score is greater than the threshold within a range, it can be concluded that the model applicator 114 has recognized certain features from the predictive data model 120 within the real-time data 162 which are indicative or application performance issues. Accordingly, the status alert on the GUI 118 is set to amber and the instructions to implement actions 306 may be executed. If the anomaly score is much higher than the threshold, it can be concluded that there are serious performance issues and a breakdown of the application 122 is imminent. In this case, the status alert in the GUI 118 can be set to red and again the instructions to implement actions 306 can be executed.

The instructions to implement actions 306 may comprise instructions to identify the actions 362 to be implemented and the instructions to implement the identified actions 364. When an amber alert or a red alert is received, actions that can be executed to lower the amber or the red alert to a green alert status can be identified from the application logs 164. For example, the instructions to implement actions 306 may include instructions to identify, from the application logs 164, features such as performance parameters, patterns or error codes and the like that are similar to those found in the real-time data 162. The actions or procedures that were executed in order to reduce the severity of the status alerts from amber or red to green can be identified. The instructions to implement the actions 364 can then be executed to automatically implementing the corrective actions 170. In an example, the corrective actions 170 can include one or more of addressing the causes giving rise to the red or amber alerts and transmitting communications to personnel in charge of monitoring the application 122.

In an example, the corrective actions 170 can include but are not limited to automatic changes that can be applied to the application 122. The action to be automatically implemented may be identified from the application logs 164. When one or more of the corrective actions 170 are automatically implemented, the AFPS 100 may collect further real-time data 162 subsequent to implementing the automatic actions. The further real-time data 162 set may be scored to determine if the status alert is green so that the success of the automatically implemented action(s) can be evaluated. By providing the ability to turn the status alert green from amber or red via the automatically implemented actions, the AFPS 100 enables the application 122 with 'self-healing' capacity. If the further real-time data 162 does not produce a green alert, then messages may be transmitted to monitoring personnel. Similarly, if no actions could be identified from the application logs 164, messages may be transmitted to monitoring personnel. In an example, an amber alert may be downgraded to a red alert upon the transmission of the messages to personnel upon failure of the AFPS 100 to identify appropriate actions to take on the application 122.

Figure 4:
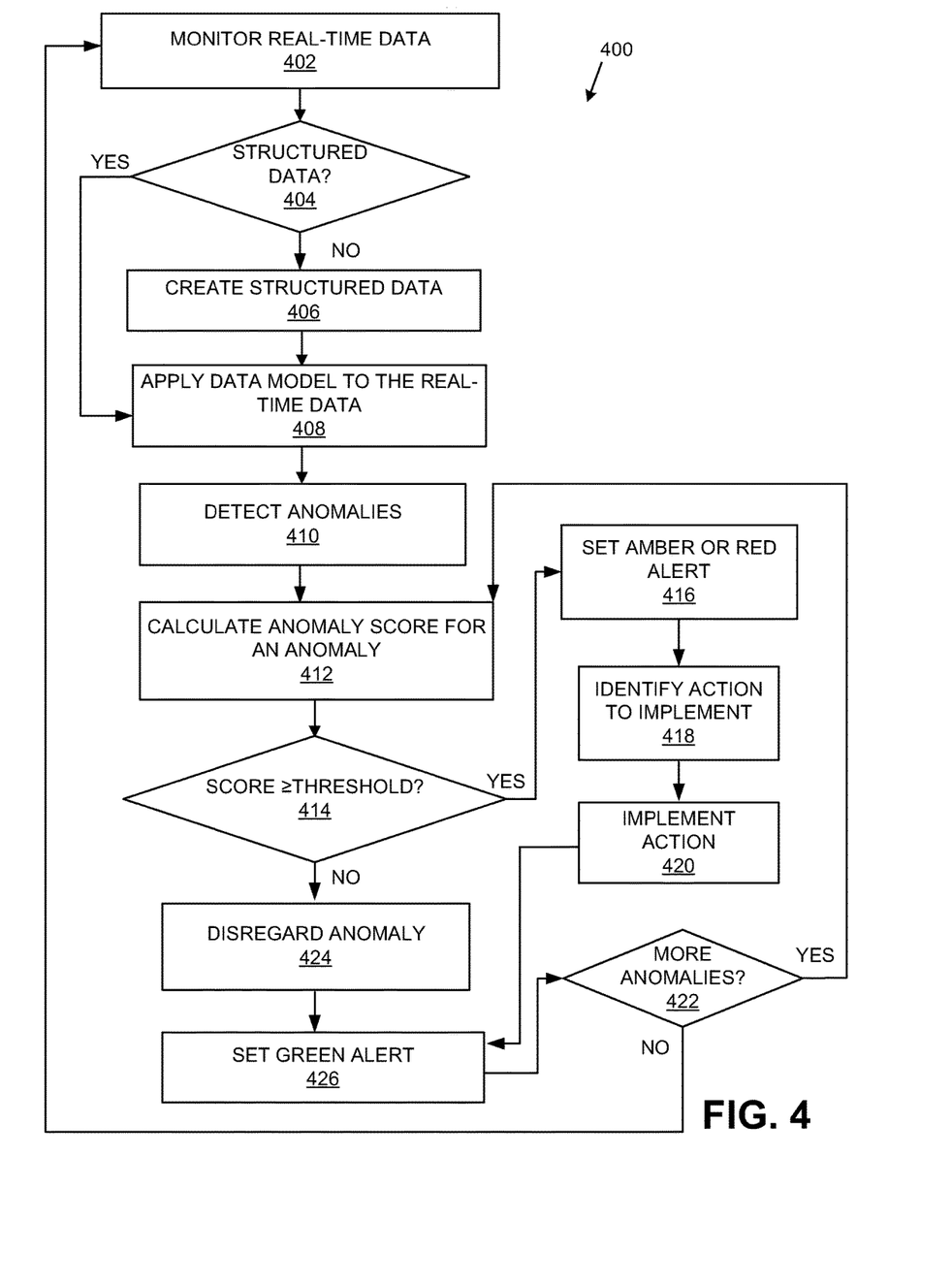
FIG. 4 is a flowchart that details an example method of detecting potential application failures or malfunctions.

FIG. 4 is a flowchart 400 that details an example method of detecting potential application failures or malfunctions. The method of detecting potential application failures as detailed herein can be carried out by the processor 102 via, for example, executing instructions included in the model applicator 114. Real-time data 162 is received at block 402 during the course of execution of the application 122. For example, if the application 122 is a web-based eCommerce application, the real-time data 162 may comprise information or data from the hardware executing the application, information from the user sessions including the log in information, data retrieved, transactions conducted, database connectivity, network performance and the like. The real-time data 162 can include structured data or unstructured data. If at block 404 it is determined that the real-time data 162 comprises unstructured data, it can be converted to structured data at block 406 using various data parsing techniques. The predictive data model 120 can then be applied to the real-time data 162 at block 408 and the anomalies are detected at 410. As mentioned herein, an anomaly is a potential application failure that the data model 120 is configured to detect. The anomalies may be detected, for example, by their characteristic temporal error patterns or other attributes. The anomaly score for an anomaly is calculated at block 412. For example, the anomaly score for a particular anomaly is calculated based on the occurrences of the various features corresponding to the anomaly in the predictive data model 120 within the real-time data 162. The anomaly score obtained at block 412 is compared to a predetermined threshold at 414. If the anomaly score of the particular anomaly is less than the predetermined threshold, it can be determined at block 422 that the probability of application malfunction arising from the particular anomaly is very low. Hence, the anomaly is disregarded at 424 and the status alert for the anomaly can be set to green at block 426. The method determines at block 422 if further anomalies are to be similarly analyzed. If yes, the method proceeds to block 412 to obtain the anomaly score for the next anomaly. If no more anomalies are to be analyzed, the method returns to block 402 to continue monitoring the real-time data 162 analyze further anomalies. It can be appreciated that the sequential processing of anomalies is discussed by the way of illustration and not limitation and that all the anomalies detected in the real-time data 162 can be simultaneously processed to obtain their anomaly scores in accordance with examples discussed herein.

If at block 412, it is determined that the anomaly score of the particular anomaly is greater than or equal to the predetermined threshold, the status alert may be changed at 416 to amber or red based on the deviation of the anomaly score from the predetermined threshold. At block 418 the action to be implemented is identified, from the application logs 164 as detailed further herein. The identified action is implemented at 420 and the method moves to block 426 to change the alert to green. At 422, it is determined if further anomalies remain to be processed. If yes, the method proceeds to block 412 to obtain the anomaly score for the next anomaly. If no more anomalies are to be analyzed, the method returns to block 402 to continue monitoring the real-time data 162 analyze further anomalies. The predictive data model 120 may be executed periodically, for example, every 2-5 minutes.

Figure 5:
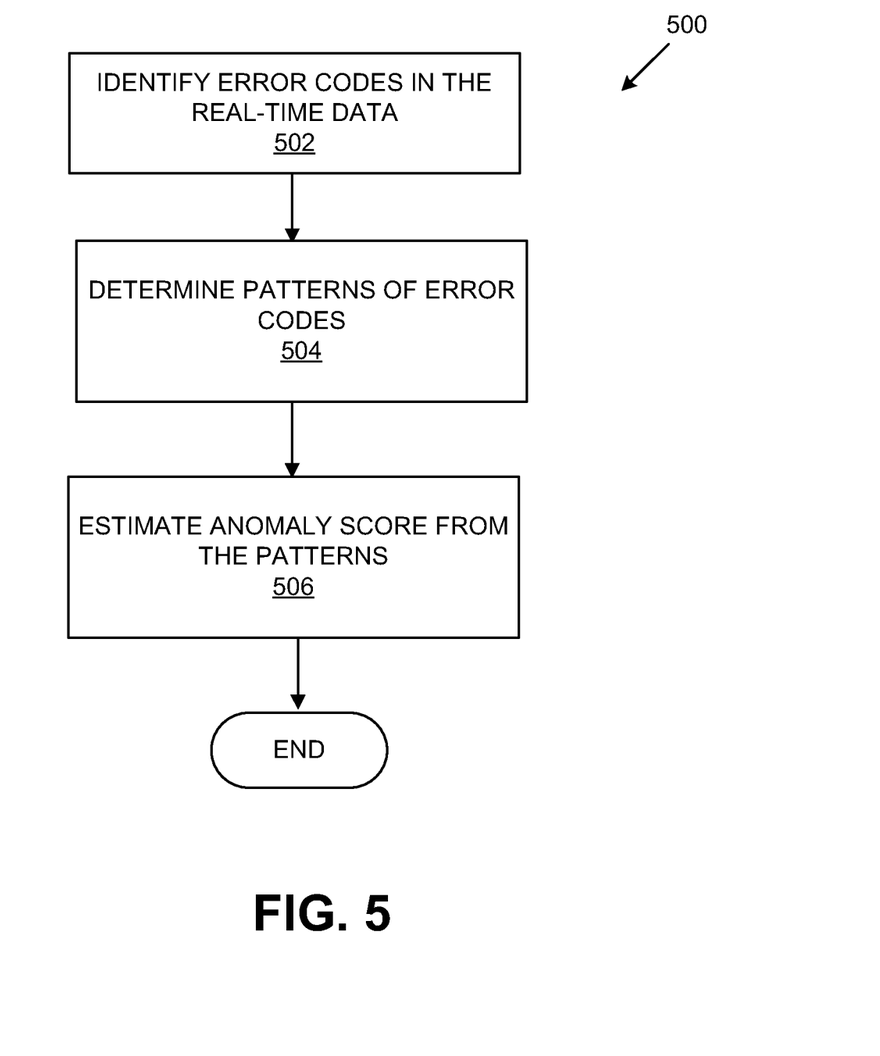
FIG. 5 is a flowchart that details an example of a method of estimating the probability of application failure.

FIG. 5 is a flowchart 500 that details one example of a method of estimating an anomaly score or the probability of application failure. As mentioned herein, the real-time data 162 includes information such as error codes that can be generated by the application 122 when errors occur during its course of operations. The error codes included in the real-time data are identified at block 502. The model applicator 114 can be trained, for example, via unsupervised learning methodologies such as isolation forest algorithm to recognize patterns of error codes or features that characterize application failures. Isolation forest algorithm is a tree based algorithm which explicitly isolates anomalies instead of profiling normal data points. Patterns of error codes which represent a temporal sequences of errors are therefore recognized at block 504. The anomaly score associated with the patterns is estimated at block 506. In an example, the anomaly score can be obtained via applying supervised learning techniques such as the random forest techniques. It can be appreciated that the unsupervised and the supervised learning methodologies are mentioned only by the way of illustration and not limitation and that other methodologies can be adopted for estimating an anomaly score for the real-time data 162.

Figure 6:
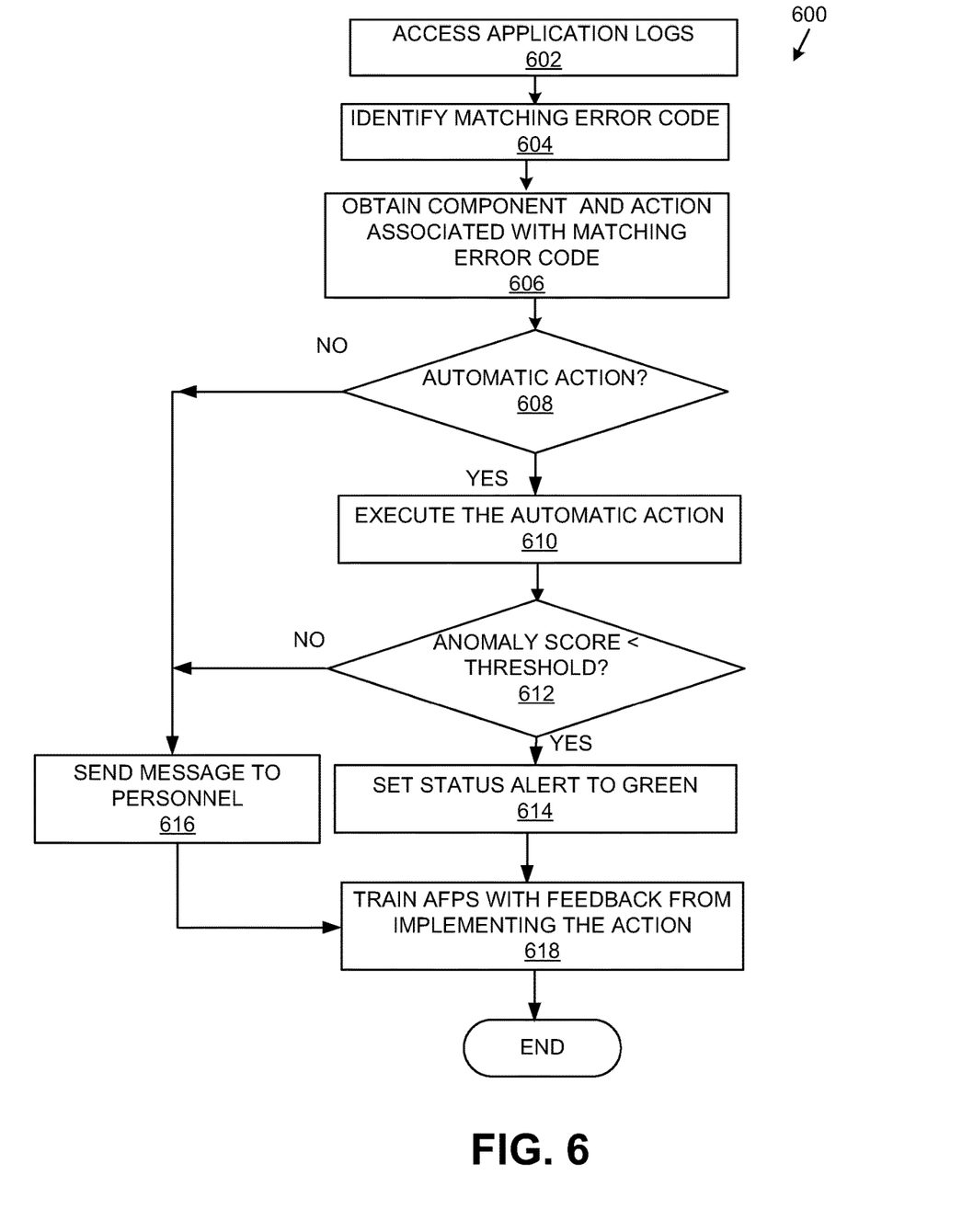
FIG. 6 is a flowchart that details an example of the method of implementing an action in response to the status alert.

FIG. 6 is a flowchart 600 that details one example of a method of implementing an action in response to the status alert being set to amber or red. The method begins at block 602 wherein the application logs 164 are accessed in order to identify solutions or corrective actions 170 to address the anomalies. When an anomaly is detected, the action(s) to be implemented can be identified via recognizing similar features or patterns of error codes from the application logs 164 and retrieving the action or series of actions that were taken to address the anomaly. The model applicator 114 can be trained via, for example, un-supervised learning to identify similar anomalies and respective corrective actions that were earlier implemented. In an example, surveys may be collected from personnel who implement corrective actions in order to train the AFPS 100. Accordingly, an error code associated with the anomaly is determined at block 604. Generally errors that occur in the application 122 are associated with respective error codes that are stored in the application logs 164 as error events occur. In an example, the AFPS 100 can store information that associates specific error codes to one or more components of the application 122 that may be the primary cause of such errors. For example, a failure of a user to log in to the application 122 can be associated with the server 166 running the application 122. A timeout on a database request can be associated with one or more of a network or a database connection and the like. The component(s) and action(s) associated with the error code can be obtained at 606. The action retrieved at block 606 may be an automatic action that does not require human intervention or it may be an action that requires human intervention.

For example, a log on error may be initially corrected by a script generated by an administrator but subsequent occurrences of the error may be addressed by automating the script. In another example, the number of connections from a data source can be increased automatically to reduce latency. An action which may thus require human intervention initially can be automated as part of the self-healing process of the AFPS 100. Similarly, actions such as transmitting different types of user interfaces based on network conditions and/or device types, selecting resources such as servers for load balancing and efficiently dealing with user requests via increasing database connections, bug fixes, routine maintenance or backup activities can be automated as part of the self-healing process. It is determined at block 608 if the action is an automatic action. If it is determined at 608 that the action is not an automatic action, the procedure jumps to block 616 to transmit a message to the personnel. In an example, the message may include information regarding any solutions or corrective actions that were identified from the application logs 164. Upon implementing the corrective actions, the personnel may be surveyed to collect information on how the error was handled so that the AFPS 100 may be trained at block 618 to handle subsequent occurrences of that error. It can be appreciated that the subsequent occurrences can be handled either automatically or manually.

If the retrieved actions can be automatically executed by the AFPS 100, then such actions are automatically executed at block 610. Upon executing the automatic actions, the procedure moves to block 612 wherein it is determined if the anomaly score is less than the threshold. In an example, the real-time data 162 subsequent to implementing the automatic actions can be collected by the AFPS 100 and scored by applying the predictive data model 120 in order to obtain the anomaly score at block 612. If it is determined at block 612 that the anomaly score it not less than the threshold, then the automatic actions failed to correct or address the errors which were detected. The procedure again jumps to block 616 to transmit a message to the personnel. In this case, the message may include information regarding the automatic actions which were executed but failed to address the anomalies. If it is determined at block 612 that the anomaly score is less than the threshold, it can be determined that the automatic actions provided the solution to correct the anomaly or application malfunction thereby preventing the application 122 from failing and hence the status alert is set to green at block 614. The feedback from regarding success of the automatic actions to address the anomaly can be used to train the AFPS 100 at block 618. The AFPS 100 is enabled to proactively monitor and correct errors that occur during the course of application execution thereby ensuring the smooth running of the various applications. Thus, an error that is predicted to occur can be avoided by taking corrective actions.

Figure 7:
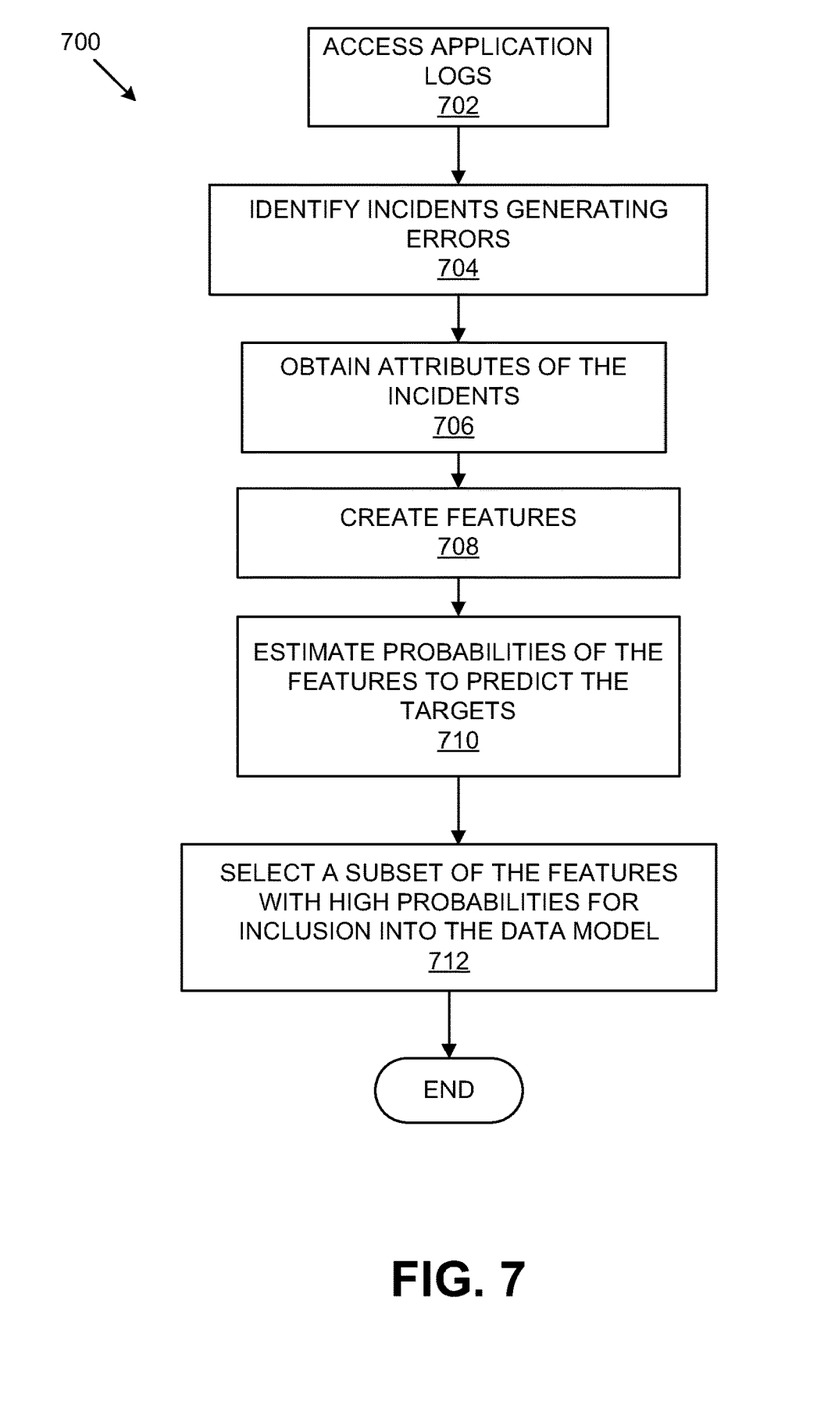
FIG. 7 is a flowchart that details an example method for generating the predictive data model.

FIG. 7 is a flowchart 700 that details an example method for generating the predictive data model 120. This method may be executed by the processor 102 in order to build the predictive data model 120 and use the predictive data model 120 for predicting application failure. The method begins at block 702 wherein the logs 164 of the application 122 that were generated during the course of its operations are accessed. In a web-based application example discussed herein, the application logs 164 can include its site monitoring data, custom error and warning codes, traces of the various transactions, output of the activities that the application does from a Java container, system outs of web servers containing user access details and logs for the access gateway of the application 122 and critical error codes identified as having the potential to lead to application failure.

From the application logs 164 described above, the incidents which generate various errors and warnings or targets are identified at block 704. For example, the application logs 164 may comprise unstructured data which is converted to structured data and parsed in order to identify the targets. At block 706, the various attributes of the targets are obtained. The attributes can include, the time stamp on the error, the error duration, the criticality of the error, the part of the network giving rise to the error, the number of times the error has occurred and the like. The attributes of the targets are obtained at block 706 may be combined to create features at block 708.

The predictive data model 120 may be represented as:

$$y=f(x)$$

where y is the failure related variable and x is the incident history over a given time period. For example, an incident or target A may be detected at block 704 and a sequence of error codes (2, 3, 4) which represent a temporal sequence of error events may be observed as attributes of the target A at block 706. Alternately, whenever the target A associated with an application malfunction is detected, it may be observed that it is preceded by the temporal sequence of error codes (2, 3, 4). Similarly, a combination of error codes 2, 4 and 7 may precede the occurrence of the incident B which may also correspond to an application failure. Accordingly, two features (2, 3, 4) and (2, 4, 7) can be created from the targets A and B. Although two examples are discussed here by the way of illustration, hundreds of incidents may be identified with their attributes being analyzed to create the various features. At block 710, the features thus created are applied against the targets in order to determine their probabilities to predict the targets. In an example, supervised learning techniques such as but not limited to random forest algorithm may be used in order to identify the features which have a high probability to predict the targets. Random forest is a general technique of random decision forests that are an ensemble learning method of classification. The features with high probability to predict their targets are selected for inclusion into the predictive data model at block 712.

Figure 8:
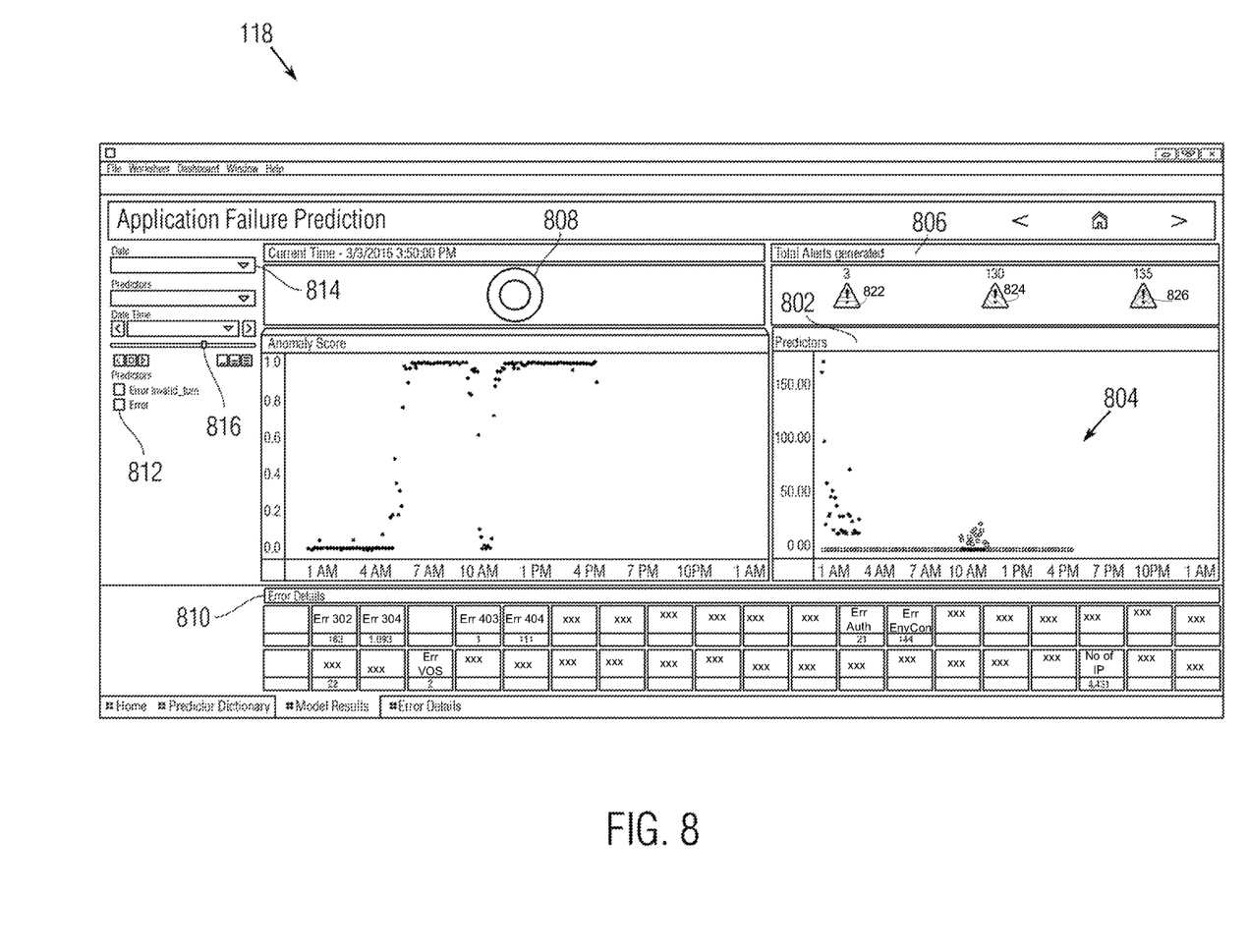
FIG. 8 illustrates an example of the graphical user interface (GUI) associated with the AFPS that allows a human user to monitor the real-time data.

FIG. 8 illustrates an example of the GUI 118 associated with the AFPS 100 that allows a human user to monitor the real-time data 162. The predictive data model 120 may be applied to score the real-time data 162 periodically, for example every 2-5 minutes, to determine the health of the application 122. The predictors or features 802 for estimating the probability of application failure are shown on the right hand side of the GUI 118. The probability of each of the features indicating application failure can be indicated on the plot 804 via points that are colored amber, green and red. The number of status alerts generated in each of the amber, red and green categories are shown on the strip 806 wherein it is indicated that 3 amber alerts, 150 green alerts and 135 red alerts are generated as indicated respectively by the shadings of the icons 822, 824 and 826. A total anomaly score for the real-time data set that is currently being analyzed on the GUI 118 can be indicated via a torus 808. The color of the torus 808 indicates the status alert of the application 122 based on the information from the real-time data 162 currently being displayed on the GUI 118.

The details of the various errors that occur in the real-time data 162 are shown in the strip 810 that is continuously updated as new information is processed by the AFPS 100. The details may comprise but are not limited to the type of error, the number of the errors occurred, the error codes and the like. The predictors 812 and their respective probabilities that are used in the anomaly score calculations are shown in the portion 812 of the GUI 118. The information generated by the AFPS 100 from its monitoring of the real-time data 162 for a given date and time can be obtained by operating the date selector 814 and a sliding time selector 816. It can be appreciated that the various details of the GUI 118 are discussed herein only for illustration and are not limiting. Other user interfaces can be employed in accordance with examples described herein to display the information generated by the AFPS 100.

In an example, the GUI 118 can be associated with the web-based, e-commerce application discussed herein. Identification of corrective actions for the complex e-commerce system with various dynamic parts constantly communicating by exchanging messages across the network 108 may involve various steps. It can be appreciated that the components of the web-based ecommer application are discussed below for illustration purposes only and that similar steps using other application components can be implemented in other applications in accordance with examples discussed herein. When a user complaint is initially received about a failure in the procedures of the application, the site confidence data for the failing step is verified and correlated with the user complaint. Next, the various logs may be validated for any possible issues. For example, logs of the application server, such as JBoss may be examined to locate OOM (out of memory) errors, thread errors, mainframe communication or database errors and the like. Similarly, the application logs are also examined to locate any exceptions related to ESB (Enterprise Service Bus) that enables interfaces for interaction between the various components of the application or to loccate exceptions related to webmethods. The apache logs are examined for HTTP (hyper text transfer protocol) error codes with proper context roots. Additionally, the access gateways (NETIQ or NAM) are also validated for possible issues.

Based on the observations described above, different actions may be implemented. In an example, an action may be implemented on the application server, such as when the correction of the error requires a restart or if there are any memory issues. If any problems exist with the Service Oriented Architecture (SOA) or the ESB, or mainframe logical partitions (LPARs) then appropriate action may be implemented on such aspects of the application. The issues in the access gateways and the actions that are to be implemented may be correlated in the access management component such as NETIQ/NAM (NetIQ Access Manager) of the web-based, ecommerce application.

Figure 9:
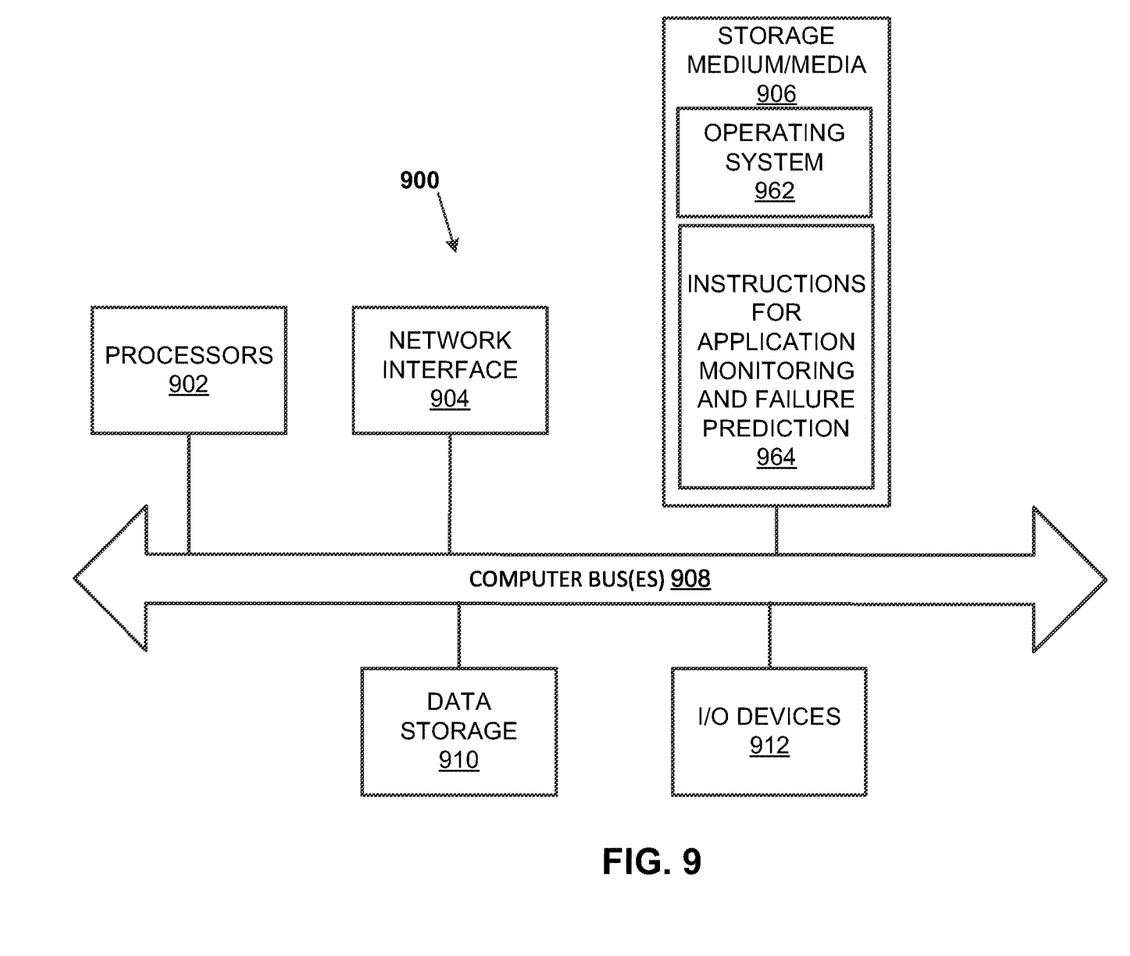
FIG. 9 illustrates a computer system that may be used to implement one or more of the AFPS or a user device.

FIG. 9 illustrates a computer system 900 that may be used to implement one or more of the AFPS 100 or a user device 152, 154. More particularly, computing machines such as desktops, laptops, smartphones, tablets, wearables which may be used to access the application 122 or execute the AFPS 100 may have the structure of the computer system 900. The computer system 900 may include additional components not shown and that some of the components described may be removed and/or modified.

The computer system 900 includes processor(s) 902, such as a central processing unit, ASIC or other type of processing circuit, input/output devices 912, such as a display, mouse keyboard, etc., a network interface 904, such as a Local Area Network (LAN), a wireless LAN, a 3G or 4G mobile WAN or a WiMax WAN, and a computer-readable medium 906. Each of these components may be operatively coupled to a bus 908. The computer-readable storage medium 906 may be any suitable medium which participates in providing instructions to the processor(s) 902 for execution. For example, the computer readable medium 906 may be non-transitory or non-volatile medium, such as a magnetic disk or solid-state non-volatile memory or volatile medium such as RAM. The instructions or modules stored on the computer readable medium 906 may include machine readable instructions for failure prediction 964 executed by the processor(s) 902 to perform the methods and functions for the AFPS 100 described herein. For example, the processor(s) 902 may correspond to the processor 102 while the computer readable medium 906 corresponds to the data store 104. The computer readable storage medium 906 may also store an operating system 962, such as MAC OS, MS WINDOWS, UNIX, or LINUX. The operating system 962 may be multi-user, multiprocessing, multitasking, multi-threading, real-time and the like. For example, during runtime, the operating system 962 is running and the application data processing and failure prediction instructions 964 are executed by the processor(s) 902. The computer system 900 additionally includes one or more data store(s) 910 which corresponds to one or more of the application logs 164 or data store for caching real-time data 162 being processed.

The network interface 904 connects the computer system 900 to internal systems for example, via a LAN. Also, the network interface 904 may connect the computer system 900 to a network 108 such as the Internet. For example, the computer system 900 may connect to web browsers and other external applications and systems via the network interface 904.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. An application failure prediction system comprising:
a processor; and
a non-transitory data storage comprising machine-readable instructions that cause the processor to:
receive for a time interval, real-time data associated with a first application executing on a computing apparatus;
analyze the real-time data using a first predictive data model to identify a plurality of anomalies within the real-time data, each of the plurality of anomalies represents a corresponding potential application failure;
determine respective anomaly scores for the plurality of anomalies based on the analysis;
compare each of the respective anomaly scores with a threshold predetermined within the first predictive data model;
indicate high probabilities for occurrence of the corresponding potential application failures for high-scoring anomalies of the plurality of anomalies, the high-scoring anomalies having the respective anomaly scores greater than the threshold; and
implement a first set of corrective actions for the high-scoring anomalies, wherein the instructions to implement the first set of corrective actions further comprise instructions that cause the processor to:
obtain from data logs of the first application, patterns of error codes similar to error codes corresponding to the high-scoring anomalies, the patterns of error codes corresponding to sequences of error events that occurred during the execution of the first application;
determine if one or more of the patterns of error codes are comprised in the data logs of the first application;
identify, in response to determining that the one or more of the patterns of error codes are comprised in the data logs, the first set of corrective actions from the data logs as being previously implemented in response to the one or more patterns of error codes; and
automatically implement the first set of corrective actions in response to identifying the one or more patterns of error codes in the data logs.

2. The application failure prediction system of claim 1, wherein the instructions to implement the first set of corrective actions further comprise instructions that cause the processor to:
transmit a user communication to in response to a failure to determine that the one or more patterns of error codes are comprised in the data logs.

3. The application failure prediction system of claim 2, wherein the instructions to transmit the user communication further comprise instructions that cause the processor to:
include in the user communication, prior corrective actions recorded in the data logs as being executed in response to the high-scoring anomalies.

4. An application failure prediction system comprising:
a processor; and
a non-transitory data storage comprising instructions that cause the processor to:
receive for a time interval, real-time data associated with a first application executing on a computing apparatus;
analyze the real-time data using a first predictive data model to identify a plurality of anomalies within the real-time data, each of the plurality of anomalies represents a corresponding potential application failure;
determine respective anomaly scores for the plurality of anomalies based on the analysis of the real-time data;
compare each of the respective anomaly scores with a threshold predetermined within the first predictive data model;
indicate high probabilities for occurrence of the corresponding potential application failures for high-scoring anomalies of the plurality of anomalies, the high-scoring anomalies having the respective anomaly scores greater than the threshold;
implement a first set of corrective actions for the high-scoring anomalies; and
disregard one or more of the plurality of anomalies having the respective anomaly scores less than the threshold.

5. The application failure prediction system of claim 4, the non-transitory data storage further comprising instructions that cause the processor to:
indicate in real-time, occurrence of the plurality of anomalies on an graphical user interface (GUI); and
further indicate resolution of at least one of the high-scoring anomalies on the GUI upon the implementation of one or more of the first set of corrective actions when the probability for occurrence of the application failure corresponding to the at least one high-scoring anomaly is reduced to below the threshold.

6. A non-transitory computer-readable storage medium comprising machine-readable instructions that cause a processor to:
- receive for a time interval, real-time data associated with a first application executing on a computing apparatus;
- analyze the real-time data using a first predictive data model that provides respective anomaly scores for each of a plurality of anomalies within the real-time data that represent a corresponding potential application failure;
- determine the respective anomaly scores for the plurality of anomalies based on the analysis;
- compare each of the respective anomaly scores with a threshold predetermined within the first predictive data model;
- indicate high probabilities for occurrence of the corresponding application failures for high-scoring anomalies of the plurality of anomalies via one of amber alerts or red alerts on a graphical user interface (GUI), the high-scoring anomalies having the respective anomaly scores greater than the threshold;
- indicate in real-time, occurrence of the plurality of anomalies on the graphical user interface (GUI); and
- implement a first set of corrective actions for the high-scoring anomalies.

7. The non-transitory computer-readable storage medium of claim 6, further comprising instructions that cause the processor to:
- convert the amber alerts or the red alerts associated with the high-scoring anomalies to green alerts upon the implementation of the first set of corrective actions.

* * * * *

UNITED STATES PATENT AND TRADEMARK OFFICE
CERTIFICATE OF CORRECTION

PATENT NO. : 10,127,125 B2
APPLICATION NO. : 15/299516
DATED : November 13, 2018
INVENTOR(S) : Mythili Krishnan et al.

Page 1 of 1

It is certified that error appears in the above-identified patent and that said Letters Patent is hereby corrected as shown below:

In the Claims

In Column 14, Line 21, Claim 2, "communication to in response" should read "communication in response".

Signed and Sealed this
Nineteenth Day of February, 2019

Andrei Iancu
*Director of the United States Patent and Trademark Office*